United States Patent
Fukui et al.

(10) Patent No.: US 11,565,975 B2
(45) Date of Patent: Jan. 31, 2023

(54) DIELECTRIC CERAMIC COMPOSITION AND ELECTRONIC COMPONENT

(71) Applicant: TDK CORPORATION, Tokyo (JP)

(72) Inventors: Takashi Fukui, Tokyo (JP); Masanori Abe, Tokyo (JP); Kazunari Kimura, Tokyo (JP); Kazusa Ohsugi, Tokyo (JP); Fuga Sato, Tokyo (JP)

(73) Assignee: TDK CORPORATION, Tokyo (JP)

( * ) Notice: Subject to any disclaimer, the term of this patent is extended or adjusted under 35 U.S.C. 154(b) by 49 days.

(21) Appl. No.: 17/212,384

(22) Filed: Mar. 25, 2021

(65) Prior Publication Data

US 2021/0300825 A1  Sep. 30, 2021

(30) Foreign Application Priority Data

Mar. 25, 2020  (JP) .............. JP2020-054715

(51) Int. Cl.
*H01G 4/12* (2006.01)
*C04B 35/20* (2006.01)
*H01B 3/12* (2006.01)

(52) U.S. Cl.
CPC ............ *C04B 35/20* (2013.01); *H01B 3/12* (2013.01); *C04B 2235/3236* (2013.01); *C04B 2235/3262* (2013.01); *C04B 2235/3281* (2013.01); *C04B 2235/3409* (2013.01); *C04B 2235/36* (2013.01); *C04B 2235/96* (2013.01)

(58) Field of Classification Search
CPC .... C04B 2235/3236; C04B 2235/3208; C04B 2235/3213; C04B 2235/3232; C04B 2235/3445; C04B 35/20; C04B 35/465; C01G 23/006
See application file for complete search history.

(56) References Cited

U.S. PATENT DOCUMENTS

| | | | |
|---|---|---|---|
| 2007/0237935 A1* | 10/2007 | Mori .................. | C03C 3/066 428/210 |
| 2009/0088314 A1 | 4/2009 | Abe et al. | |
| 2013/0222971 A1 | 8/2013 | Nishimura et al. | |
| 2016/0111217 A1 | 4/2016 | Nishimura et al. | |
| 2019/0092692 A1 | 3/2019 | Fukui et al. | |

FOREIGN PATENT DOCUMENTS

| | | |
|---|---|---|
| CN | 103124707 A | 5/2013 |
| CN | 109553406 A | 4/2019 |
| JP | 4650111 B2 | 3/2011 |
| JP | 4868663 B2 | 2/2012 |

* cited by examiner

*Primary Examiner* — Karl E Group
*Assistant Examiner* — Cameron K Miller
(74) *Attorney, Agent, or Firm* — Oliff PLC

(57) ABSTRACT

Provided is a dielectric ceramic composition comprising a main component of forsterite and calcium strontium titanate. A content ratio of forsterite in the main component is from 84.0 to 92.5 parts by mole, and a content ratio of calcium strontium titanate is from 7.5 to 16.0 parts by mole. (Sr+Ca)/Ti in the calcium strontium titanate is from 1.03 to 1.20 in terms of a molar ratio. With respect to a total of 100 parts by mass of the main component and a subcomponent except for Li-containing glass, from 2 to 10 parts by mass of Li-containing glass is added. The Li-containing glass includes $Al_2O_3$ in an amount of from 1% by mass to 10% by mass.

9 Claims, No Drawings

DIELECTRIC CERAMIC COMPOSITION AND ELECTRONIC COMPONENT

BACKGROUND OF THE INVENTION

The present invention relates to a dielectric ceramic composition and an electronic component.

In recent years, mobile communication devices such as a smartphone whose demand has been increasing use radio waves in a high frequency band with a frequency of approximately from several hundreds of MHz to several GHz. The radio waves are called a so-called quasi-microwave. Accordingly, even in an electronic component that is used in the mobile communication devices, various properties suitable for use in the high frequency band have been required. In addition, an excellent low-temperature co-fired ceramic (LTCC) material suitable for use in the high frequency band has been required. Particularly, various methods for obtaining the LTCC material excellent in various properties have been suggested.

Patent Document 1 suggests a dielectric ceramic composition in which the kind of a main component and a subcomponent and the amount of a main component and a subcomponent are set within specific ranges, and thus low permittivity, a high Qf value, and a temperature property of a frequency are satisfactory, and mechanical strength is also high. Patent Document 2 suggests a low-temperature fired ceramic composition in which low softening point glass is contained in a ceramic powder within a specific range, and thus sinterability of the ceramic at a low temperature is improved and a coefficient of thermal expansion and a Q value are satisfactory. Patent Document 3 suggests a dielectric ceramic which contains a forsterite-based crystal phase and a crystal phase composed of an oxide containing Ti as main components, and in which each of the main components has a composition within a specific range, and thus specific permittivity is low and adjustment of a temperature property is easy.

[Patent Document 1] Japanese Patent No. 4506802
[Patent Document 2] Japanese Patent No. 4868663
[Patent Document 3] Japanese Patent No. 4650111

BRIEF SUMMARY OF INVENTION

However, currently, it is required to provide a dielectric ceramic composition in which a Q value and strength are higher, and a temperature property of a resonance frequency is satisfactory.

An object of the invention is to provide a dielectric ceramic composition in which a Q value, a temperature property of a resonance frequency, and strength are satisfactory.

In order to achieve the above object, a dielectric ceramic composition according to the present invention includes a main component of forsterite and calcium strontium titanate, in which a content ratio of forsterite in the main component is from 84.0 to 92.5 parts by mole, and a content ratio of calcium strontium titanate is from 7.5 to 16.0 parts by mole, (Sr+Ca)/Ti in the calcium strontium titanate is from 1.03 to 1.20 in terms of a molar ratio, with respect to a total of 100 parts by mass of the main component and a subcomponent except for Li-containing glass, from 2 to 10 parts by mass of Li-containing glass is added, and the Li-containing glass includes $Al_2O_3$ in an amount of from 1% by mass to 10% by mass.

By having the above-described configuration, the dielectric ceramic composition according to the present invention is a dielectric ceramic composition in which a Q value, a temperature property of a resonance frequency, and strength of the dielectric ceramic composition are satisfactory.

Ca/(Sr+Ca) in the calcium strontium titanate may be from 0.60 to 1.00 in terms of a molar ratio.

The Li-containing glass may include $SiO_2$ in an amount of from 25% by mass to 45% by mass, BaO in an amount of from 20% by mass to 40% by mass, CaO in an amount of from 10% by mass to 30% by mass, and $Li_2O$ in an amount of from 10% by mass to 30% by mass.

The Li-containing glass substantially may not include $B_2O_3$.

The subcomponent may include a Cu-containing compound in terms of CuO in an amount of from 0.5 to 3.0 parts by mass, a B-containing compound in terms of $B_2O_3$ in an amount of from 0.2 to 3.0 parts by mass, an Al-containing compound in terms of $Al_2O_3$ in an amount of from 0.3 to 3.0 parts by mass, and a Mn-containing compound in terms of MnO in an amount of from 0.05 to 1.5 parts by mass with respect to 100 parts by mass of the main component.

An electronic component according to the present invention includes the above dielectric ceramic composition.

DETAILED DESCRIPTION OF INVENTION

Hereinafter, description will be given of an embodiment for appropriately carrying out the invention.

A dielectric ceramic composition according to this embodiment includes a main component of forsterite and calcium strontium titanate. Forsterite is a compound composed of magnesium oxide and silicon dioxide ($Mg_2SiO_4$). $MgO:SiO_2$ in forsterite can be set within a range of from 1.9:1.1 to 2.1:0.9 in terms of a molar ratio. In addition, calcium strontium titanate is expressed as $(Sr_{1-x}Ca_x)_yTiO_{2+y}$. In this embodiment, relationships of $0 \leq x \leq 1$ and $1.03 \leq y \leq 1.20$ are satisfied. That is, calcium strontium titanate may be composed of only strontium titanate, or may be composed of only calcium titanate.

Description of "the dielectric ceramic composition includes a main component of forsterite and calcium strontium titanate" represents that the dielectric ceramic composition includes forsterite and calcium strontium titanate in a total amount of 80% by mass or more with respect to 100% by mass of the entirety of the dielectric ceramic composition. Components other than the main component may be contained as a subcomponent.

A content ratio of forsterite in the main component is from 84.0 to 92.5 parts by mole, and a content ratio of calcium strontium titanate is from 7.5 to 16.0 parts by mole. In a case where the content ratios of the compounds in the main component are out of the above-described range, temperature dependence of a resonance frequency of the dielectric ceramic composition excessively increases. That is, an absolute value of a change rate of the resonance frequency due to a temperature change of the dielectric ceramic composition excessively increases. In addition, the larger the content ratio of the calcium strontium titanate is, the smaller a Q value of the dielectric ceramic composition. Particularly, the smaller Ca/(Sr+Ca) to be described later is, likely, the smaller the Q value tends to be.

(Sr+Ca)/Ti in the calcium strontium titanate is from 1.03 to 1.20 in terms of a molar ratio. In a case where (Sr+Ca)/Ti is excessively small, the strength of the dielectric ceramic composition decreases. In a case where (Sr+Ca)/Ti is excessively large, the Q value of the dielectric ceramic composition decreases.

Ca/(Sr+Ca) in calcium strontium titanate is not particularly limited, but may be from 0.60 to 1.00, from 0.80 to 1.00, or from 0.89 to 1.00 in terms of a molar ratio. That is, a relationship of 0.60≤x≤1.00 may be satisfied, a relationship of 0.80≤x≤1.00 may be satisfied, or a relationship of 0.89≤x≤1.00 may be satisfied. The larger Ca/(Sr+Ca) is, the further the Q value and strength of the dielectric ceramic composition tend to increase.

In addition, the dielectric ceramic composition according to this embodiment is a dielectric ceramic composition obtained by adding Li-containing glass in an amount of from 2 to 10 parts by mass with respect to a total of 100 parts by mass of the main component and a subcomponent except for the Li-containing glass. Note that, glass containing $Li_2O$ in an amount of 5% by mass or more is referred to as "Li-containing glass". In a case where the dielectric ceramic composition is added Li-containing glass in an amount of excessively small, low-temperature sintering is less likely to occur. In a case where the dielectric ceramic composition is added Li-containing glass in an amount of excessively large, the Q value decreases, and a dielectric loss increases. The amount of the Li-containing glass added is preferably from 3 to 7 parts by mass.

The Li-containing glass according to this embodiment includes $Al_2O_3$ in an amount of from 1% by mass to 10% by mass with respect to 100% by mass of the entirety of the Li-containing glass.

If the Li-containing glass includes $Al_2O_3$ in an amount of 1% by mass or more, Li-containing glass in which crystallization and devitrification are less likely to occur when the Li-containing glass is made is obtained. In addition, when the Li-containing glass includes $Al_2O_3$ in an amount of 10% by mass or less, low-temperature sintering is likely to occur when the dielectric ceramic composition is manufactured (fired).

The Li-containing glass according to this embodiment may be, for example, $SiO_2$—$BaO$—$CaO$—$Al_2O_3$—$Li_2O$-based glass. In addition, the Li-containing glass may include $SiO_2$ in an amount of from 25% by mass to 45% by mass, BaO in an amount of from 20% by mass to 40% by mass, CaO in an amount of from 10% by mass to 30% by mass, $Al_2O_3$ in an amount of from 1% by mass to 10% by mass, and $Li_2O$ in an amount of from 10% by mass to 30% by mass with respect to 100% by mass of the entirety of the Li-containing glass.

The Li-containing glass according to this embodiment substantially may not include $B_2O_3$. Description of "the Li-containing glass substantially don't include $B_2O_3$" represents that the Li-containing glass includes $B_2O_3$ in an amount of 0.1% by mass or less (including 0% by mass) with respect to 100% by mass of the entirety of the Li-containing glass. In the dielectric ceramic composition according to this embodiment, in a case where the Li-containing glass includes $B_2O_3$, the Q value is likely to decreases, and the dielectric loss is likely to increase. In addition, in a case where the Li-containing glass is the $SiO_2$—$BaO$—$CaO$—$Al_2O_3$—$Li_2O$-based glass, the kinds of components other than $SiO_2$, BaO, CaO, $Al_2O_3$, $Li_2O$, and $B_2O_3$ and content ratios thereof are not particularly limited. For example, the $SiO_2$—$BaO$—$CaO$—$Al_2O_3$—$Li_2O$-based glass may include SrO and the like in a total amount of 1% by mass or less.

The dielectric ceramic composition according to this embodiment may include a subcomponent other than the main component and the Li-containing glass. The kind and the amount of the subcomponent are not particularly limited. For example, the dielectric ceramic composition may include a Cu-containing compound in terms of CuO in an amount of from 0.5 to 3.0 parts by mass, a B-containing compound in terms of $B_2O_3$ in an amount of from 0.2 to 3.0 parts by mass, an Al-containing compound in terms of $Al_2O_3$ in an amount of from 0.3 to 3.0 parts by mass, and a Mn-containing compound in terms of MnO in an amount of from 0.05 to 1.5 parts by mass with respect to 100 parts by mass of the main component. Note that, examples of a compound containing each element include an oxide, a carbonate, a nitrate, an oxalate, a hydroxide, a sulfide, an organic metal compound of each element, and the like.

If the dielectric ceramic composition according to this embodiment includes the Cu-containing compound as the subcomponent, low-temperature sintering is likely to occur and the Q value of a sintered body is likely to be improved when the dielectric ceramic composition is made. In addition, the dielectric ceramic composition may include Cu-containing compound in terms of CuO in an amount of from 0.5 to 2.5 parts by mass with respect to 100 parts by mass of the main component. The smaller the amount of the Cu-containing compound is, the less low-temperature sintering is likely to occur. The larger the amount of the Cu-containing compound is, the more the Q value of the sintered body is likely to decrease.

If the dielectric ceramic composition according to this embodiment includes the B-containing compound as the subcomponent, low-temperature sintering is likely to occur and the Q value of the sintered body is likely to be improved when the dielectric ceramic composition is made. In addition, the dielectric ceramic composition may include B-containing compound in terms of $B_2O_3$ in an amount of from 0.2 to 2.5 parts by mass with respect to 100 parts by mass of the main component. The smaller the B-containing compound is, the less low-temperature sintering is likely to occur. The larger the B-containing compound is, the more the Q value is likely to occur.

If the dielectric ceramic composition according to this embodiment includes the Mn-containing compound as the subcomponent, low-temperature sintering is likely to occur and the Q value of the sintered body is likely to be improved when the dielectric ceramic composition is manufactured. In addition, the dielectric ceramic composition may include the Mn-containing compound in terms of MnO in an amount of from 0.05 to 1.0 part by mass with respect to 100 parts by mass of the main component. When the dielectric ceramic composition includes Mn-containing compound within the above-described range, particularly, in an amount of 0.05 parts by mass or more, low-temperature sintering is likely to occur when the dielectric ceramic composition is manufactured. In addition, the Q value is likely to be improved.

Note that, the dielectric ceramic composition of this embodiment may contain a subcomponent other than the above-described compounds, but it is preferable that the dielectric ceramic composition substantially don't include a Zn-containing compound. The dielectric ceramic composition substantially don't include a Zn-containing compound when a peak of ZnO is not observed by performing XRD measurement for a sintered body after firing, and a peak of a compound composed of forsterite and ZnO, a peak of a compound composed of Li-containing glass and ZnO, and a peak of a compound composed of each subcomponent and ZnO are also not observed by performing XRD measurement for the sintered body after firing. In addition, in this case, the dielectric ceramic composition includes the Zn-containing compound in terms of an oxide (ZnO) in an amount of approximately less than 0.05 parts by mass with respect to 100 parts by mass of the main component. If the dielectric ceramic composition substantially doesn't include a Zn-containing compound, the Q value and humidity resistance of the dielectric ceramic composition of this embodiment are improved.

In addition, the dielectric ceramic composition of this embodiment is not particularly limited to a total amount of subcomponents other than the above-described subcomponents, and may contain the subcomponents within a range not deteriorating the effect of the invention. For example, the dielectric ceramic composition may include the subcomponents in terms of an oxide in a total amount of 10 parts by mass with respect to 100 parts by mass of the entirety of the dielectric ceramic composition.

Note that, in this embodiment, firing represents a heating treatment for sintering, and a firing temperature is a temperature of an atmosphere to which the dielectric ceramic composition is exposed during the heating treatment.

A dielectric property of the dielectric ceramic composition according to this embodiment can be evaluated by a Qf value, a resonance frequency temperature property (a change rate of a resonance frequency due to a temperature change: τf), and specific permittivity εr of a sintered body of the dielectric ceramic composition. The Qf value and the specific permittivity εr can be measured in conformity to Japanese Industrial Standard "Testing method for dielectric properties of fine ceramics at microwave frequency" (JIS R1627: 1996).

$Mg_2SiO_4$ (forsterite) is included as a main component in the dielectric ceramic composition according to this embodiment. Qf value of $Mg_2SiO_4$ alone is 200,000 GHz or more and a dielectric loss of $Mg_2SiO_4$ is small, and thus $Mg_2SiO_4$ has a function of decreasing a dielectric loss of the dielectric ceramic composition. In addition, specific permittivity εr of $Mg_2SiO_4$ is as low as approximately from 6 to 7, and thus $Mg_2SiO_4$ also has a function of decreasing specific permittivity εr of the dielectric ceramic composition. Here, the dielectric loss is a phenomenon in which a part of high frequency energy is dissipated as heat. The magnitude of the dielectric loss is expressed as Q. Q is a reciprocal of tangent of a loss angle δ. That is, $Q=1/\tan \delta$. The loss angle δ is a difference between a phase difference of actual current and voltage and a phase difference (90°) of ideal current and voltage. In evaluation of the dielectric loss of the dielectric ceramic composition, a Qf value that is the product of the Q value and a resonance frequency f is used. When the dielectric loss decreases, the Qf value increases, and when the dielectric loss increases, the Qf value decreases. The dielectric loss represents a power loss of a high frequency device, and thus the Qf value of the dielectric ceramic composition is preferably large. However, in this embodiment, the resonance frequency f in test is regarded to be approximately constant, and the Q value is used in evaluation of the dielectric loss.

With regard to evaluation of the resonance frequency temperature property, evaluation may be made on a change rate of a resonance frequency due to a temperature change (τf) in a case where a resonance frequency at two kinds of temperatures is measured, and one temperature is set as a reference temperature. It can be said that the smaller an absolute value of τf is, the more the resonance frequency temperature property is satisfactory.

A method of evaluating the strength of the dielectric ceramic composition according to this embodiment is not particularly limited. For example, three-point bending strength may be evaluated.

Hereinafter, an example of a method of manufacturing the dielectric ceramic composition and a sintered body according to this embodiment will be described below. The method of manufacturing the dielectric ceramic composition and a sintered body according to this embodiment includes the following processes.

(a) A forsterite crystal powder preparing process of preparing a forsterite crystal powder by mixing a raw material powder of magnesium oxide and a raw material powder of silicon dioxide and performing a heat treatment on the resultant mixture (b) A calcium strontium titanate powder preparing process of preparing a calcium strontium titanate powder (c) A Li-containing glass preparing process of preparing Li-containing glass (d) A calcination process of adding a raw material powder of a subcomponent to the forsterite crystal powder and the calcium strontium titanate powder, and performing calcination (e) A dielectric ceramic composition preparation process of adding Li-containing glass to the powder after calcination and pulverizing the resultant mixture to obtain a dielectric ceramic composition (f) A firing process of firing the dielectric ceramic composition to obtain a sintered body of the dielectric ceramic composition <Forsterite Crystal Powder Preparing Process>

A method of preparing a forsterite crystal powder is not particularly limited. For example, first, MgO and $SiO_2$ are prepared as raw materials, and are weighed to prepare $Mg_2SiO_4$. Next, the weighed raw materials are mixed and pulverized by using a ball mill, and then the resultant mixture is calcined. A powder after calcination becomes a forsterite powder. In addition, the forsterite powder may be obtained by pulverizing commercially available forsterite. The forsterite powder may be used as a main component powder of the dielectric ceramic composition.

<Calcium Strontium Titanate Powder Preparing Process>

A method of preparing the calcium strontium titanate powder is not particularly limited. For example, $SrCO_3$, $CaCO_3$, and $TiO_2$ may be prepared as raw materials, may be weighed in combination so that (Sr+Ca)/Ti and Ca/(Sr+Ca) are within a predetermined range, may be mixed and pulverized by using a ball mill, and may be subjected to calcination to compose the calcium strontium titanate powder. In addition, the calcium strontium titanate powder may be obtained by pulverizing commercially available calcium strontium titanate in which (Sr+Ca)/Ti and Ca/(Sr+Ca) are within a predetermined range. The calcium strontium titanate powder is used as a main component powder of the dielectric ceramic composition.

<Li-Containing Glass Preparing Process>

A method of preparing the Li-containing glass is not particularly limited. For example, raw materials of respective components contained in the Li-containing glass are prepared as raw materials, and weighed and mixed in desired ratios. A mixing method is not particularly limited. For example, dry mixing may be performed for from 10 to 30 hours. Next, the resultant mixture is melted at 1500° C., and a ribbon-shaped formed body having a thickness of approximately 0.5 mm is obtained by roll out. A furnace that is used in melting is not particularly limited. For example, a continuous melting furnace may be used. After the ribbon-shaped formed body is dry pulverized with a ball mill, pulverization may be performed with a ball mill so that an average particle size becomes from 0.5 to 5 μm while performing classification. In addition, commercially available Li-containing glass having a composition within a predetermined range may be used.

<Calcination Process>

In the calcination process, the powders of the main components, and the raw material powder of the subcomponent are weighed in a predetermined amount, and the powders are mixed and are subjected to a heat treatment. As the raw material of the subcomponent, a compound that becomes an oxide when being fired a heat treatment such as calcination to be described later may be used. Examples of the compound that becomes an oxide through firing include a carbonate, a nitrate, an oxalate, a hydroxide, a sulfide, an organic metal compound, and the like. Note that, the subcomponent may be added as impurities of a powder of the main component. Note that, weighing of each raw material of the subcomponent is performed so that the amount (parts by mass) of each subcomponent in the dielectric ceramic composition becomes a desired value. There is no particular limitation to calcination conditions.

Mixing may be performed by a mixing method such as drying mixing and wet mixing. For example, mixing may be performed by a mixing method using a solvent such as pure water and ethanol with a mixing and dispersing device such as a ball mill. A mixing time may be set to approximately from 4 to 24 hours.

It is preferable that a raw material mixed powder is dried for approximately from 12 to 36 hours at a drying temperature of from 100° C. to 200° C., and more preferably from 120° C. to 140° C.

For example, the dried raw material mixed powder is heat treated (calcined) at a temperature of from 600° C. to 850° C. for approximately from 1 to 10 hours. When performing the calcination in the calcination process at a temperature lower than a firing temperature, forsterite in the raw material mixed powder is suppressed from being melted, and forsterite can be contained in the dielectric ceramic composition in a crystal type.

<Dielectric Ceramic Composition Preparation Process>

The Li-containing glass is added to the calcined powder, and the resultant mixture is pulverized to obtain a dielectric ceramic composition. There is no particular limitation to a specific method. For example, the Li-containing glass may be added to the calcined powder. The resultant mixture may be mixed and pulverized, and may be dried. Pulverization may be performed by a pulverization method such as dry pulverization and a wet pulverization. A pulverization time may be set to approximately from 4 to 24 hours. It is preferable that drying of the powder after the pulverization is performed for approximately from 12 to 36 hours at a treatment temperature of from 80° C. to 200° C., and more preferably from 100° C. to 140° C.

Due to the above-described method, the main components of the dielectric ceramic composition and the subcomponent of the dielectric ceramic composition are uniformly mixed, and thus a dielectric ceramic composition having a uniform material can be obtained.

After obtaining the dielectric ceramic composition, it transitions to a firing process of firing the dielectric ceramic composition.

<Firing Process>

In a firing process, the obtained dielectric ceramic composition is fired to obtain a sintered body. For example, it is preferable that the firing is performed in an oxygen atmosphere such as the air. There is no particular limitation to a firing temperature. For example, the firing temperature may be from 800° C. to 1100° C., or from 800° C. to 950° C.

Even when the dielectric ceramic composition that is obtained by using the method of manufacturing the dielectric ceramic composition according to this embodiment is fired at a low temperature of from 800° C. to 1100° C., a relative density can be sufficiently raised. Accordingly, the dielectric ceramic composition according to this embodiment can be fired at a low temperature at the firing process, and sinterability of the dielectric ceramic composition can be secured. In addition, the dielectric ceramic composition is excellent in the Q value, the change rate τf of a resonance frequency due to a temperature change, and the strength. Accordingly, the dielectric ceramic composition according to this embodiment can be appropriately used as a dielectric layer that constitutes a part of an electronic component such as a filter, a resonator, a capacitor, and a circuit board.

Hereinbefore, a preferred embodiment of the dielectric ceramic composition according to the invention was described above, but the invention is not limited to the above-described embodiment. For example, other compounds may be contained within a range not greatly deteriorating a dielectric property and strength.

EXAMPLES

Hereinafter, the invention will be described in more detail with reference to examples and comparative examples, but the invention is not limited to the following examples.

<Preparation of Dielectric Ceramic Composition>

With regard to the forsterite crystal powder ($Mg_2SiO_4$ powder), MgO and $SiO_2$ which are raw materials were weighed so that the number of moles of Mg becomes two times the number of moles of Si, were mixed and pulverized by using a ball mill, and the resultant mixture was calcined to be composed.

With regard to the calcium strontium titanate powder, first, high-purity $SrCO_3$, $CaCO_3$, and $TiO_2$ were prepared as raw materials. Next, the raw materials were weighed in combination so that (Sr+Ca)/Ti and Ca/(Sr+Ca) shown in Table 1 are obtained. The raw materials were mixed and pulverized by using a ball mill, and then the resultant mixture was calcined to compose the calcium strontium titanate powder.

Next, the obtained forsterite crystal powder and the calcium strontium titanate powder were mixed so that a charge composition becomes a composition of the main component shown in Table 1. In addition, with respect to 100 parts by mass of the main component, 1.5 parts by mass of CuO, 1.0 part by mass of $B_2O_3$, 0.3 parts by mass of $MnCO_3$ in terms of MnO, and 1.0 part by mass of $Al_2O_3$ as a subcomponent were added. In addition, calcination was performed at 800° C. for two hours to obtain a calcined body. In addition, Li-containing glass was added in an addition amount shown in Table 1. Note that, $MnCO_3$ is converted to MnO during the above-described calcination and/or firing to be described later. In addition, the addition amount of the Li-containing glass described in Table 1 is an addition amount in a case where a total of the main component and the subcomponent except for the Li-containing glass is set to 100 parts by mass in terms of an oxide. In addition, $SiO_2$—BaO—CaO—$Al_2O_3$—$Li_2O$-based glass having a composition shown in Table 1 was prepared and used as the Li-containing glass.

The Li-containing glass was prepared by the following method. First, as a raw material of the Li-containing glass, $SiO_2$, $Al_2O_3$, $B_2O_3$ (only in Example 13), $CaCO_3$, $BaCO_3$, and $Li_2CO_3$ were weighed to be a ratio shown in Table 1 in terms of an oxide, and dry mixing was performed for two hours. Next, the obtained resultant mixture was melted at 1500° C. in a continuous melting furnace, and a ribbon-shaped formed body having a thickness of approximately 0.5 mm was obtained by roll out. The ribbon-shaped formed body was dry pulverized to 100 meshes or less by a ball mill, and then pulverization was performed with a $ZrO_2$ ball mill so that an average particle size becomes 3 μm while performing wind power classification. In addition, the Li-containing glass to be added to the main component and the subcomponent after calcination was obtained.

Note that, an attempt was made to prepare Li-containing glass having a composition in Comparative Example 5, but the following test was not performed on Comparative Example 5 because crystals were deposited and devitrified. Note that, in the case of preparing a dielectric ceramic composition by using the devitrified Li-containing glass, it is considered that sintering may be insufficient.

In addition, as an organic binder, 10% by mass of poly (ethyl methacrylate) that is an organic binder was added to the above-described mixture, and the mixture was sheet-molded by a doctor blade method to prepare a plurality of sheet formed bodies. After the plurality of sheet formed bodies was stacked and were pressed to be molded in a board shape, thereby preparing a sheet stacked formed body. The sheet stacked formed body was cut in a desired size to obtain a chip. After chamfering the chip, the chip was fired at a firing temperature of 900° C. for two hours to prepare a sintered body of the dielectric ceramic composition. A mixing amount of the organic binder was approximately changed depending on compositions of respective examples and comparative examples.

The specific permittivity εr, the Q value, the change rate τf of the resonance frequency due to a temperature change, and the three-point bending strength in the obtained sintered body of the dielectric ceramic composition in each of examples and comparative examples were measured.

<Sintering Density>

Cutting was performed so that a test specimen after firing has dimensions of approximately 4.5 mm×3.2 mm×0.8 mm, and dimensions in respective directions were accurately measured with a micrometer. In addition, the mass of a cut test specimen was measured with an electronic balance. A sintering density was measured by dividing the mass of the cut test specimen by the volume of the cut test specimen. When a density of $Mg_2SiO_4$ was set to 3.2 g/cm³, a density of $CaTiO_3$ was set to 4.1 g/cm³, and a density of $SrTiO_3$ was set to 5.1 g/cm³, in a case where the sintering density was 90% or less of a theoretical density calculated from a content ratio of each compound, this case was determined as difficult. In Comparative Examples 6 and 7 in which the sintering density was determined as difficult, sintering was insufficient, and thus evaluation was not made.

<Specific Permittivity εr and Q Value>

The specific permittivity εr and the Q value of the sintered body were measured in conformity to Japanese Industrial Standard "Testing method for dielectric properties of fine ceramics at microwave frequency" (JIS R1627: 1996). Specifically, a cylinder (pellet) of 10 mmφ×5 mm was prepared, and the specific permittivity εr and the dielectric loss tangent tan δ were calculated by a both-end short-circuited type dielectric resonator. In addition, 1/tan δ was set as Q. In the case of Q≥1500, the Q value was determined as satisfactory. In the case of Q≥1600, the Q value was determined as more preferable.

<Change Rate of Resonance Frequency Due to Temperature Change: τf>

With respect to the pellet, a resonance frequency at 25° C. and 85° C. was measured in conformity to Japanese Industrial Standard "Testing method for dielectric properties of fine ceramics at microwave frequency" (JIS R1627: 1996), and in a case where a reference temperature is set as 25° C., a change rate of the resonance frequency due to a temperature change was set as τf. In a case where an absolute value of τf was 20 ppm/° C. or less, that is, in a case where τf was from −20 ppm/° C. to 20 ppm/° C., the resonance frequency temperature property was determined as satisfactory.

<Three-Point Bending Strength (Transverse Strength)>

Cutting was performed so that the thickness of a test specimen of each dielectric ceramic becomes approximately 0.4 mm, and a width thereof becomes approximately 2.6 mm, and three-point bending strength was measured with respect to the obtained test specimen. In measurement of the three-point bending strength, a measurement device (product name: 5543, manufactured by Instron Inc.) was used. A distance (jig distance) between two points at which the test specimen was supported in measurement of the three-point bending strength was set to 15 mm, and a measurement speed of the three-point bending strength was set to 0.5 mm/min. An average value (unit: MPa) of values obtained by measuring the three-point bending strength with respect to 30 test specimens was set as a measurement value of the three-point bending strength. Note that, in a case where the measurement value of the three-point bending strength was 250 MPa or more, the measurement value was determined as satisfactory.

TABLE 1

| | Composition of main component (mol %) | | Composition of calcium strontium titanate (molar ratio) | | Composition of Li-containing glass (parts by mass) | | | | | | | Addition amount of Li glass | | | Sintered body properties | | | |
|---|---|---|---|---|---|---|---|---|---|---|---|---|---|---|---|---|---|---|
| | Forsterite | Calcium strontium titanate | (Sr + Ca)/Ti | (Sr + Ca) | $SiO_2$ | BaO | CaO | $Al_2O_3$ | $Li_2O$ | $B_2O_3$ | Vitrification | (parts by mass) | 900° C. sintering | εr | Q | τf (ppm/° C.) | Three-point bending strength (MPa) |
| Comparative Example 1 | 93.0 | 7.0 | 1.12 | 0.89 | 33 | 28 | 18 | 5 | 16 | 0 | Possible | 5.0 | Possible | 9.1 | 1950 | −30 | 250 |
| Example 1 | 92.5 | 7.5 | 1.12 | 0.89 | 33 | 28 | 18 | 5 | 16 | 0 | Possible | 5.0 | Possible | 9.3 | 1900 | −20 | 270 |
| Example 2 | 91.0 | 9.0 | 1.12 | 0.89 | 33 | 28 | 18 | 5 | 16 | 0 | Possible | 5.0 | Possible | 9.5 | 1700 | −10 | 280 |

TABLE 1-continued

| | Composition of main component (mol %) | | Composition of calcium strontium titanate (molar ratio) | | Composition of Li-containing glass (parts by mass) | | | | | | | Addition amount of Li glass (parts by mass) | | Sintered body properties | | | |
|---|---|---|---|---|---|---|---|---|---|---|---|---|---|---|---|---|---|
| | Forsterite | Calcium strontium titanate | (Sr + Ca)/Ti | Ca/(Sr + Ca) | SiO$_2$ | BaO | CaO | Al$_2$O$_3$ | Li$_2$O | B$_2$O$_3$ | Vitrification | | 900° C. sintering | εr | Q | τf (ppm/° C.) | Three-point bending strength (MPa) |
| Example 3 | 88.0 | 12.0 | 1.12 | 0.89 | 33 | 28 | 18 | 5 | 16 | 0 | Possible | 5.0 | Possible | 9.7 | 1800 | 0 | 280 |
| Example 4 | 86.0 | 14.0 | 1.12 | 0.89 | 33 | 28 | 18 | 5 | 16 | 0 | Possible | 5.0 | Possible | 10.5 | 1750 | 10 | 280 |
| Example 5 | 84.0 | 16.0 | 1.12 | 0.89 | 33 | 28 | 18 | 5 | 16 | 0 | Possible | 5.0 | Possible | 11.2 | 1700 | 20 | 280 |
| Comparative Example 2 | 83.5 | 16.5 | 1.12 | 0.89 | 33 | 28 | 18 | 5 | 16 | 0 | Possible | 5.0 | Possible | 11.4 | 1600 | 30 | 290 |
| Comparative Example 3 | 88.0 | 12.0 | 1.02 | 0.89 | 33 | 28 | 18 | 5 | 16 | 0 | Possible | 5.0 | Possible | 9.6 | 1800 | 0 | 240 |
| Example 6 | 88.0 | 12.0 | 1.03 | 0.89 | 33 | 28 | 18 | 5 | 16 | 0 | Possible | 5.0 | Possible | 9.6 | 1800 | 0 | 250 |
| Example 7 | 88.0 | 12.0 | 1.05 | 0.89 | 33 | 28 | 18 | 5 | 16 | 0 | Possible | 5.0 | Possible | 9.7 | 1800 | 0 | 270 |
| Example 3 | 88.0 | 12.0 | 1.12 | 0.89 | 33 | 28 | 18 | 5 | 16 | 0 | Possible | 5.0 | Possible | 9.7 | 1800 | 0 | 280 |
| Example 8 | 88.0 | 12.0 | 1.15 | 0.89 | 33 | 28 | 18 | 5 | 16 | 0 | Possible | 5.0 | Possible | 9.7 | 1800 | 0 | 280 |
| Example 9 | 88.0 | 12.0 | 1.20 | 0.89 | 33 | 28 | 18 | 5 | 16 | 0 | Possible | 5.0 | Possible | 9.6 | 1600 | 0 | 290 |
| Comparative Example 4 | 88.0 | 12.0 | 1.21 | 0.89 | 33 | 28 | 18 | 5 | 16 | 0 | Possible | 5.0 | Possible | 9.6 | 1400 | 0 | 290 |
| Comparative Example 5 | 88.0 | 12.0 | 1.12 | 0.89 | 37 | 28 | 18 | 0 | 16 | 0 | Difficult | — | — | — | — | — | — |
| Example 10 | 88.0 | 12.0 | 1.12 | 0.89 | 37 | 28 | 18 | 1 | 16 | 0 | Possible | 5.0 | Possible | 9.4 | 1800 | 0 | 260 |
| Example 3 | 88.0 | 12.0 | 1.12 | 0.89 | 33 | 28 | 18 | 5 | 16 | 0 | Possible | 5.0 | Possible | 9.7 | 1800 | 0 | 280 |
| Example 11 | 88.0 | 12.0 | 1.12 | 0.89 | 28 | 28 | 18 | 10 | 16 | 0 | Possible | 5.0 | Possible | 10.3 | 1800 | 0 | 270 |
| Example 12 | 88.0 | 12.0 | 1.12 | 0.89 | 33 | 25 | 16 | 10 | 16 | 0 | Possible | 5.0 | Possible | 10.3 | 1800 | 0 | 270 |
| Example 13 | 88.0 | 12.0 | 1.12 | 0.89 | 13 | 28 | 18 | 10 | 16 | 15 | Possible | 5.0 | Possible | 10.1 | 1500 | 0 | 280 |
| Comparative Example 6 | 88.0 | 12.0 | 1.12 | 0.89 | 27 | 28 | 18 | 11 | 16 | 0 | Possible | 5.0 | Difficult | — | — | — | — |
| Comparative Example 7 | 88.0 | 12.0 | 1.12 | 0.89 | 33 | 28 | 18 | 5 | 16 | 0 | Possible | 1.0 | Difficult | — | — | — | — |
| Example 14 | 88.0 | 12.0 | 1.12 | 0.89 | 33 | 28 | 18 | 5 | 16 | 0 | Possible | 2.0 | Possible | 9.3 | 1800 | 0 | 260 |
| Example 3 | 88.0 | 12.0 | 1.12 | 0.89 | 33 | 28 | 18 | 5 | 16 | 0 | Possible | 5.0 | Possible | 9.7 | 1800 | 0 | 280 |
| Example 15 | 88.0 | 12.0 | 1.12 | 0.89 | 33 | 28 | 18 | 5 | 16 | 0 | Possible | 10.0 | Possible | 10.0 | 1500 | 0 | 290 |
| Comparative Example 8 | 88.0 | 12.0 | 1.12 | 0.89 | 33 | 28 | 18 | 5 | 16 | 0 | Possible | 11.0 | Possible | 10.5 | 1400 | 0 | 290 |
| Example 16 | 88.0 | 12.0 | 1.12 | 0.50 | 33 | 28 | 18 | 5 | 16 | 0 | Possible | 5.0 | Possible | 9.3 | 1500 | −10 | 270 |
| Example 17 | 88.0 | 12.0 | 1.12 | 0.60 | 33 | 28 | 18 | 5 | 16 | 0 | Possible | 5.0 | Possible | 9.4 | 1700 | −5 | 270 |
| Example 3 | 88.0 | 12.0 | 1.12 | 0.89 | 33 | 28 | 18 | 5 | 16 | 0 | Possible | 5.0 | Possible | 9.7 | 1800 | 0 | 280 |
| Example 18 | 88.0 | 12.0 | 1.12 | 1.00 | 33 | 28 | 18 | 5 | 16 | 0 | Possible | 5.0 | Possible | 9.8 | 1800 | 3 | 290 |
| Example 19 | 88.0 | 12.0 | 1.12 | 0.89 | 36 | 30 | 19 | 5 | 10 | 0 | Possible | 5.0 | Possible | 9.3 | 1600 | 0 | 260 |
| Example 3 | 88.0 | 12.0 | 1.12 | 0.89 | 33 | 28 | 18 | 5 | 16 | 0 | Possible | 5.0 | Possible | 9.7 | 1800 | 0 | 280 |
| Example 20 | 88.0 | 12.0 | 1.12 | 0.89 | 27 | 23 | 15 | 5 | 30 | 0 | Possible | 5.0 | Possible | 9.6 | 1600 | 0 | 250 |

From Table 1, in examples in which all compositions are within ranges of the invention, a sufficient sintering density could be obtained even when firing was performed at a low temperature of 900° C. In addition, the Q value, τf, and the three-point bending strength were satisfactory.

In contrast, in Comparative Examples 1 to 4, and 8 in which a composition of any one subcomponent is out of the range of the invention, any one or more of the Q value, τf, and the three-point bending strength were not satisfactory.

In addition, a composition of a calcined body after calcination and before addition of the Li-containing glass was confirmed through actual measurement in Example 3. Specifically, the calcined body was pulverized into a powder, and fluorescent X-ray analysis was performed by using Primus IV manufactured by Rigaku Corporation. A charge composition and an analysis value of the calcined body in Example 3 are shown in Table 2. Note that, an analysis value of the composition of the main component, that is, an analysis value (unit: mol %) of the amount of forsterite and an analysis value (unit: mol %) of the amount of the calcium strontium titanate were calculated from an analysis value of an amount of Mg and an analysis value of an amount of Ti in the calcined body. (Sr+Ca)/Ti and Ca/(Sr+Ca) are molar ratios calculated from an analysis value of Sr, an analysis value of Ca, and an analysis value of Ti.

TABLE 2

|  | Composition of main component (mol %) | | Composition of calcium strontium titanate (molar ratio) | |
| --- | --- | --- | --- | --- |
|  | Forsterite | Calcium strontium titanate | (Sr + Ca)/ Ti | Ca/ (Sr + Ca) |
| Charge composition | 88.0 | 12.0 | 1.12 | 0.89 |
| Fluorescent X-ray analysis result | 87.9 | 12.1 | 1.12 | 0.89 |

From Table 2, in examples, it could be confirmed that the composition of the main component, the (Sr+Ca)/Ti, and Ca/(Sr+Ca) are almost the same between the charge composition and the analysis value of the calcined body.

Note that, with regard to the amount of ZnO in the calcined body, confirmation was made by the fluorescent X-ray analysis in a similar manner. From this, it could be confirmed that the amount of Zn was less than 0.05 parts by mass with respect to 100 parts by mass of the main component, and was substantially not contained.

What is claimed is:

1. A dielectric ceramic composition comprising a main component of forsterite and calcium strontium titanate,
    wherein a content ratio of forsterite in the main component is from 84.0 to 92.5 parts by mole, and a content ratio of calcium strontium titanate is from 7.5 to 16.0 parts by mole,
    (Sr+Ca)/Ti in the calcium strontium titanate is from 1.03 to 1.20 in terms of a molar ratio,
    an amount of a Li-containing glass is from 2 to 10 parts by mass, provided that the total amount of the main component and a subcomponent except for the Li-containing glass is 100 parts by mass, and
    the Li-containing glass includes $Al_2O_3$ in an amount of from 1% by mass to 10% by mass.

2. The dielectric ceramic composition according to claim 1,
    wherein Ca/(Sr+Ca) in the calcium strontium titanate is from 0.60 to 1.00 in terms of a molar ratio.

3. The dielectric ceramic composition according to claim 1,
    wherein the Li-containing glass includes $SiO_2$ in an amount of from 25% by mass to 45% by mass, BaO in an amount of from 20% by mass to 40% by mass, CaO in an amount of from 10% by mass to 30% by mass, and $Li_2O$ in an amount of from 10% by mass to 30% by mass.

4. The dielectric ceramic composition according to claim 1,
    wherein the Li-containing glass substantially does not include $B_2O_3$.

5. The dielectric ceramic composition according to claim 1,
    wherein the subcomponent includes a Cu-containing compound in terms of CuO in an amount of from 0.5 to 3.0 parts by mass, a B-containing compound in terms of $B_2O_3$ in an amount of from 0.2 to 3.0 parts by mass, an Al-containing compound in terms of $Al_2O_3$ in an amount of from 0.3 to 3.0 parts by mass, and a Mn-containing compound in terms of MnO in an amount of from 0.05 to 1.5 parts by mass with respect to 100 parts by mass of the main component.

6. An electronic component comprising:
    the dielectric ceramic composition according to claim 1.

7. The dielectric ceramic composition according to claim 1,
    wherein the amount of Li-containing glass is 3 to 7 parts by mass.

8. The dielectric ceramic composition according to claim 1,
    wherein Ca/(Sr+Ca) in the calcium strontium titanate is from 0.80 to 1.00 in terms of a molar ratio.

9. The dielectric ceramic composition according to claim 1,
    wherein Ca/(Sr+Ca) in the calcium strontium titanate is from 0.89 to 1.00 in terms of a molar ratio.

* * * * *